(12) United States Patent
Oguri et al.

(10) Patent No.: US 10,126,556 B2
(45) Date of Patent: Nov. 13, 2018

(54) LIGHT OPERATION DEVICE (71) Applicant: FURUKAWA ELECTRIC CO., LTD., Tokyo (JP)

(72) Inventors: Atsushi Oguri, Tokyo (JP); Nobuyuki Kagi, Tokyo (JP); Masaki Iwama, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 643 days.

(21) Appl. No.: 14/802,682

(22) Filed: Jul. 17, 2015

(65) Prior Publication Data

US 2015/0355469 A1 Dec. 10, 2015

Related U.S. Application Data (63) Continuation of application No. PCT/IB2014/000099, filed on Feb. 3, 2014.

(30) Foreign Application Priority Data

Jan. 17, 2013 (JP) ................................ 2013-006629

(51) Int. Cl.
*G02B 27/09* (2006.01)
*H04Q 11/00* (2006.01)
(Continued)

(52) U.S. Cl.
CPC ........ *G02B 27/0911* (2013.01); *G02B 6/3518* (2013.01); *G02B 27/0927* (2013.01); *H04J 14/02* (2013.01); *H04Q 11/0003* (2013.01)

(58) Field of Classification Search
CPC ............... H04Q 11/00; H04Q 11/0001; H04Q 11/0003; G02B 27/09; G02B 27/0905;
(Continued)

(56) References Cited

U.S. PATENT DOCUMENTS 4,203,652 A * 5/1980 Hanada ................ G02B 6/4206
359/641
6,825,981 B2 * 11/2004 Takushima ......... G02B 6/29311
359/566

(Continued)

FOREIGN PATENT DOCUMENTS

| JP | 2004-133203 A | 4/2004 |
| JP | 2007-183370 A | 7/2007 |
| JP | 2009-276747 A | 11/2009 |

OTHER PUBLICATIONS

International Search Report dated Apr. 1, 2014 in PCT/IB2014/000099 filed Feb. 3, 2014 with English Translation.
(Continued)

*Primary Examiner* — Robert E Tallman
(74) *Attorney, Agent, or Firm* — Oblon, McClelland, Maier & Neustadt, L.L.P.

(57) ABSTRACT

A light operation device includes: an light input and output port; an light-operating element reflecting a light input from any one of the ports of the light input and output port and outputting the reflected light to any one of the ports of the light input and output port; a condensing lens system disposed between the light input and output port and the light-operating element and optically-coupling the light input and output port with the light-operating element; an anamorphic optical system disposed between the light input and output port and the condensing lens system and expanding a beam diameter of the light input from a side of the light input and output port in a beam-diameter-expanding direction. In the condensing lens system, a first focal distance in the beam-diameter-expanding direction and a second focal distance in a direction perpendicular to the beam-diameter-expanding direction differ from each other.

11 Claims, 5 Drawing Sheets

(51) Int. Cl.
*H04J 14/02* (2006.01)
*G02B 6/35* (2006.01)

(58) Field of Classification Search
CPC ............ G02B 27/0911; G02B 27/0933; G02B 27/0938–27/0944; G02B 27/0955; G02B 27/0972; G02B 27/0977
USPC ........ 359/641, 618, 625–627, 629, 634–637, 359/639–640, 362, 434, 435, 325, 359/237–240, 298–299, 196.1, 359/201.1–21.2, 221.2, 223.1, 226.1; 385/9, 905, 911, 938–944, 95, 955, 972, 385/977
See application file for complete search history.

(56) References Cited

U.S. PATENT DOCUMENTS

| | | |
|---|---|---|
| 6,859,324 B2 | 2/2005 | Meyers et al. |
| 7,340,128 B2 | 3/2008 | Shibata et al. |
| 8,190,025 B2 | 5/2012 | Presley et al. |
| 8,243,372 B2 | 8/2012 | Aota et al. |
| 2004/0021952 A1 | 2/2004 | Meyers et al. |
| 2009/0220192 A1 | 9/2009 | Presley et al. |

OTHER PUBLICATIONS

Written Opinion dated Apr. 1, 2014 in PCT/IB2014/000099 filed Feb. 3, 2014 with English Translation.

* cited by examiner

FIG.9

LIGHT OPERATION DEVICE

CROSS-REFERENCE TO RELATED APPLICATION

This application is a continuation of PCT International Application No. PCT/IB2014/000099 filed on Feb. 3, 2014 which claims the benefit of priority from Japanese Patent Application No. 2013-006629 filed on Jan. 17, 2013, the entire contents of which are incorporated herein by reference.

BACKGROUND OF THE INVENTION

1. Field of the Invention

The present invention relates to a light operation device.

2. Description of the Related Art

In recent years, optical communication systems are being developed, in their forms, from a point-to-point type to a ring-type or mesh-type network. A node in this form of the network requires an optical switching device into which an arbitrary signal light is input to or output from an arbitrary port to change a path for the signal light arbitrarily.

In particular, in a case of using a wavelength division multiplexing (WDM) signal light in which signals of mutually different wavelengths are subjected to WDM, a wavelength-selective optical-switch device is required which is capable of changing a path arbitrarily for an arbitrary wavelength of signal light.

In a wavelength-selective optical-switch device described in U.S. Pat. No. 8,243,372 specification, an anamorphic prism is disposed between an input port into which a signal light is input and a diffraction grating. This anamorphic prism expands a beam diameter of the signal light prior to reaching the diffraction grating in a direction in which the diffraction grating disperses the light (dispersion direction) and makes the light be in an oval shape in which the dispersion direction is in a major axis direction. That is, the dispersion direction and the direction in which the anamorphic prism expands the beam diameter are approximately the same. Subsequently, the dispersed signal light is condensed to a reflection element by a condensing lens. In this state, if the light incident into the condensing lens is large in beam diameter, the condensed light is small in beam diameter, and if the light incident into the condensing lens is small in beam diameter, the condensed light is large in beam diameter. Therefore, the beam diameter of the condensed signal light is in an oval shape in which the major axis is in a direction perpendicular to the dispersion direction of the light (optical switching direction).

SUMMARY OF THE INVENTION

It is an object of the present invention to at least partially solve the problems in the conventional technology.

In accordance with one aspect of the present invention, a light operation device includes: an light input and output port having at least a port into which a light is input from outside, or from which a light is output to outside; an light-operating element reflecting a light input from any one of the ports of the light input and output port and outputting the reflected light to any one of the ports of the light input and output port; a condensing lens system being disposed between the light input and output port and the light-operating element and coupling the light input and output port with the light-operating element optically; an anamorphic optical system being disposed between the light input and output port and the condensing lens system and expanding a beam diameter of the light input from a side of the light input and output port in a beam-diameter-expanding direction. In the condensing lens system, a first focal distance in the beam-diameter-expanding direction and a second focal distance in a direction perpendicular to the beam-diameter-expanding direction differ from each other.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of a light control device according to the present invention will be described in detail with reference to the drawings. However, the present invention is not limited to the embodiments. Also, in each drawing, if deemed appropriate, identical or equivalent elements are given same reference numerals. In addition, it should be noted that the drawings are schematic depictions, and do not represent the actual relation of dimension of each element. Furthermore, different drawings may include portions using different scales and dimensional relations.

Figure 8:
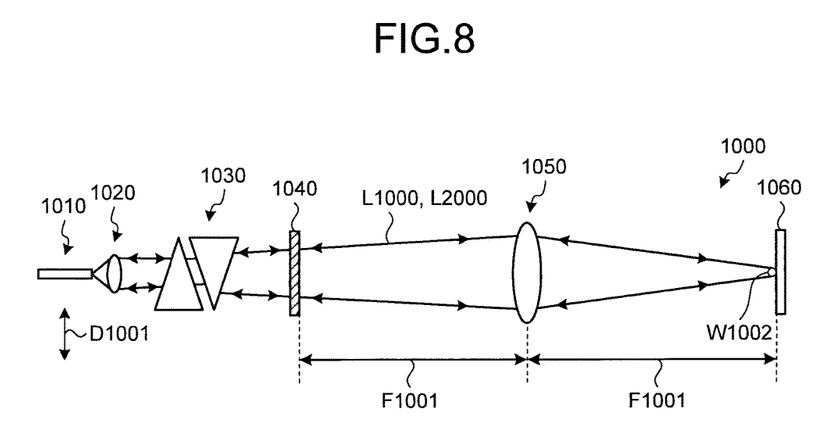
FIG. 8 is a view showing an example of designing an arrangement of elements in the optical switching device.
Figure 9:
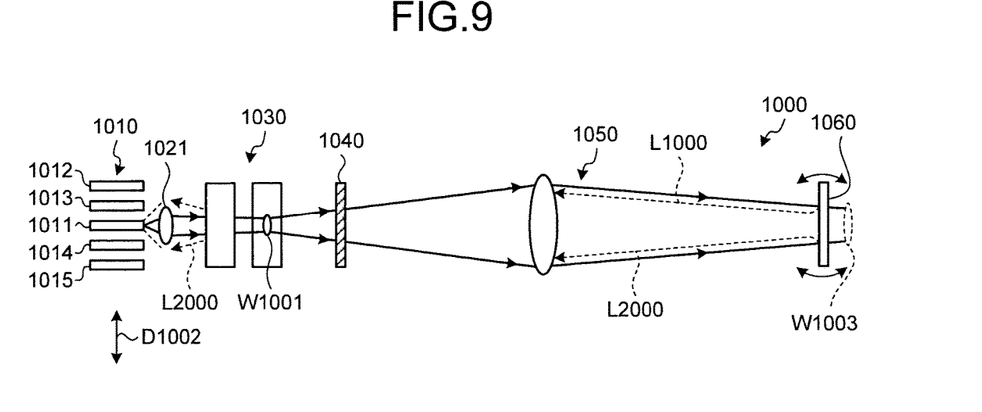
FIG. 9 is a view showing an example of designing an arrangement of elements in the optical switching device.

FIGS. 8 and 9 are drawings showing an example of design for arrangement of elements in an optical switching device. FIG. 8 is a drawing of an optical switching device 1000 viewed from a direction perpendicular to an optical dispersion direction (an expanding direction of a beam diameter of an anamorphic prism pair indicated by a direction D1001). FIG. 9 is a drawing of the optical switching device 1000 viewed from a direction perpendicular to an optical switching direction (indicated by a direction D1002).

The optical switching device 1000 is configured by arranging an light input and output port 1010, a collimator lens array 1020, an anamorphic prism pair 1030, a diffraction grating 1040, a condensing lens 1050, and an optical switching element 1060 in this order. In the light input and output port 1010, optical fiber ports are arranged along the optical switching direction.

Since the optical path is bent at the diffraction grating 1040 actually, each of the elements from the anamorphic prism pair 1030 to the optical switching element 1060 are disposed with an angle prior to, and subsequent to, the diffraction grating 1040. In addition, sometimes the optical path may be shifted in a direction, i.e., the direction D1001 in the anamorphic prism pair 1030. FIGS. 8 and 9 show each of the elements disposed in series to simplify explanation.

Although, as the collimator lens array 1020, FIG. 9 shows only a collimator lens 1021 corresponding to an optical fiber port 1011 constituting the light input and output port 1010, each of the collimator lenses of the collimator lens array 1020 is provided to correspond to each of the optical fiber ports 1011 configuring the light input and output port 1010.

As well be described later, signal lights L1000 and L2000 are Gaussian beams. In FIGS. 8 and 9, schematic arrow lines indicate paths of spot sizes (beam radius at which optical intensity is $1/e^2$ of the peal) of the Gaussian beams of the signal lights L1000 and L2000.

Operation of the optical switching device 1000 will be explained. Firstly, when the optical fiber port 1011 outputs a certain wavelength of signal light L1000 which is input from outside, a corresponding one of the collimator lenses 1021 of the collimator lens array 1020 makes the input signal light L1000 to an approximately collimated light of which beam shape is an approximate circular. The anamorphic prism pair 1030 expands the beam shape of the approximately collimated signal light L1000 in a beam-diameter-expanding direction and makes the beam shape oval. The diffraction grating 1040 diffracts the oval-shaped signal light L1000 at a predetermined diffraction angle corresponding to a wavelength of the signal light L1000. The condensing lens 1050 makes the diffracted signal light L1000 be condensed on the optical switching element 1060. The optical switching element 1060 is, for example, a reflection element, and a rotation angle is adjusted to reflect the condensed signal light L1000 at a predetermined reflection angle to obtain the signal light L2000. For simplifying explanations, the reflection angle is 0 degree in FIGS. 8 and 9. The condensing lens 1050 makes the reflected signal light L2000 an approximately collimated light. The diffraction grating 1040 diffracts the signal light L2000 at a predetermined diffraction angle.

Subsequently, the anamorphic prism pair 1030 reduces the beam shape of the signal light L2000 in the beam-spreading direction with its optical reciprocity back to an approximate circular shape. Subsequently, the signal light L2000 is input to one of the collimator lenses of the collimator lens array 1020 corresponding to the reflection angle of the optical switching element 1060 (herein the collimator lens 1021). The collimator lens 1021 condenses the signal light L2000 to be coupled with the optical fiber port 1011. The optical fiber port 1011 outputs the coupled light to outside.

In a case of switching the path of the signal light input from the optical fiber port 1011 to another one of the optical fiber ports 1012, 1013, 1014, 1015 respectively, the optical switching device 1000 enables, in the above-described operation, switching of a desirable path by adjusting the rotation angle of the optical switching element 1060 to cause the signal light L1000 to be reflected, and coupled with, one of the optical fiber ports 1012, 1013, 1014, 1015.

Herein, as an ordinary design, it is preferable that the diffraction grating 1040 be disposed at a position of the beam-waist W1001 of the signal light L1000 output from the collimator lens 1021 and that the diffraction grating 1040 and the optical switching element 1060 be disposed at positions of the focal distance F1001 of the condensing lens 1050. Hereby, the position of the beam-waist W1002 of the signal light L1000 having transmitted through the condensing lens 1050 coincides with the position of the optical switching element 1060, and thus, when viewed in the direction perpendicular to the optical dispersion direction (direction D1002), the signal light L1000 dispersed by the diffraction grating 1040 is incident to the optical switching element 1060 perpendicularly, and the signal light L2000 is condensed on an end face of each optical fiber of the light input and output port 1010. Herein the beam-waist of the Gaussian beam indicates a position where a wave front of the Gaussian beam becomes flat and the beam diameter is minimized.

However, in a case of disposing the anamorphic prism pair 1030 between the collimator lens array 1020 and the diffraction grating 1040 like the optical switching device 1000, it is difficult to dispose the diffraction grating 1040 at the position of the beam-waist W1001 of the signal light L1000 output from the collimator lens 1021 since a space is necessary for disposing the anamorphic prism pair 1030. As a result, sometimes, the position of the beam-waist W1002 of the signal light L1000 having transmitted through the condensing lens 1050 is shifted from the position of the optical switching element 1060.

The beam diameter of the light expanded by the anamorphic prism pair 1030 in the beam-diameter-expanding direction is large. Therefore, a tolerance is large for a shift between a distance from the position of the beam-waist of light incident to the condensing lens 1050 (a side to the collimator lens array 1020 relative to the diffraction grating 1040) to the condensing lens 1050 and the focal distance F1001 of the condensing lens 1050. As a result, even if there is a shift, the light is condensed at the beam-waist W1002 separated from the condensing lens 1050 by approximately the focal distance F1001. Therefore, the condensing position of the signal light L2000 as the reflected signal light by the collimator lens 1021 coincides with the end face of the optical fiber port 1011. FIG. 8 showing that the arrow lines, which indicate the paths of the spot sizes of the signal light L1000 and the signal light L2000, coincide indicates that the paths of the spot size coincide approximately between the signal light L1000 and the signal light L2000.

On the other hand, in the optical switching direction D1002, the beam-waist W1001 remains small. Therefore, a tolerance is small for a shift between the distance from the beam-waist W1001 to the condensing lens 1050 and the focal distance of the condensing lens 1050. Therefore, a shift of the position of a beam-waist W1003 from the position of the optical switching element 1060 becomes noticeable as shown in FIG. 9, the beam-waist is formed at a position farther than the optical switching element 1060. As a result, the condensing position of the signal light L2000 as the reflected signal light by the collimator lens 1021 is shifted from an end face of the optical fiber port 1011. Hereby a coupling efficiency for the signal light L2000 and the optical fiber port 1011 decreases, and thus, an optical loss occurs.

As described above, since the anamorphic optical system causes a decrease in optical characteristics in the optical switching device provided with the anamorphic optical system, it is preferable that a degree of freedom in optical design be increased more.

In contrast, the embodiment described below obtains an effect of an increased degree of freedom in optical design.

Figure 1:
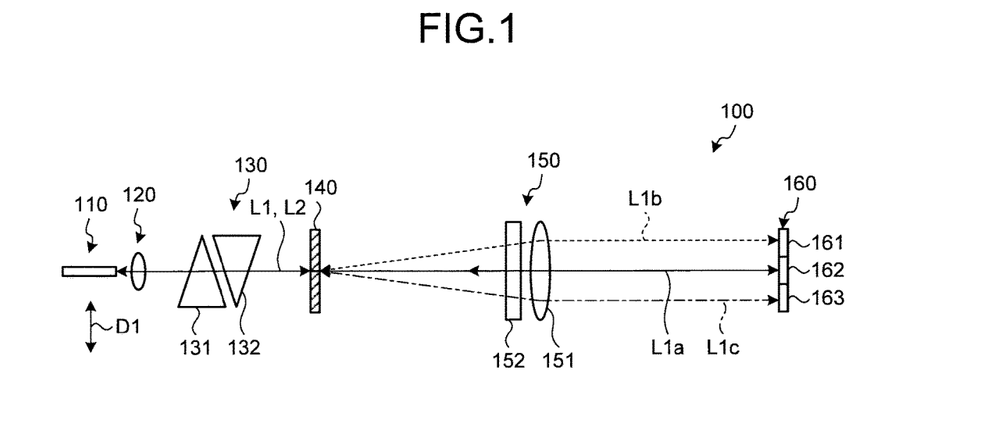
FIG. 1 is a schematic configuration diagram of an optical switching device according to an embodiment.
Figure 2:
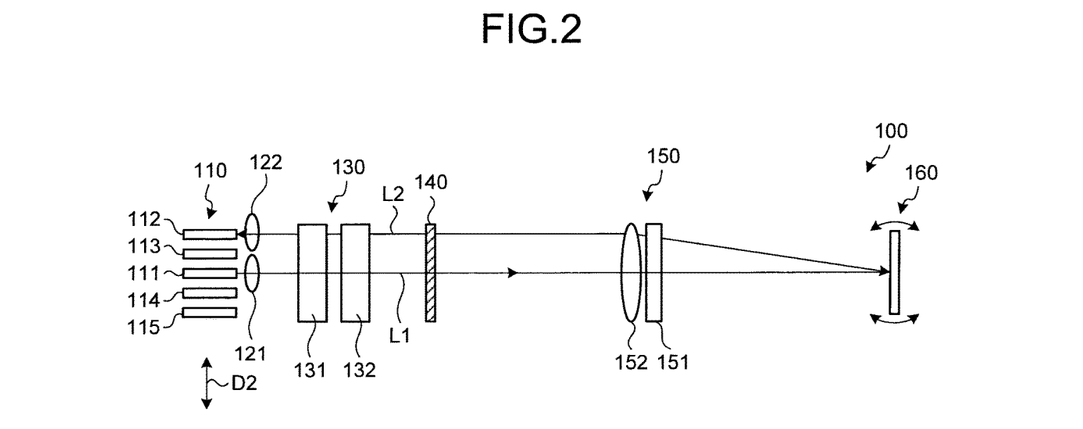
FIG. 2 is a schematic configuration diagram of the optical switching device according to the embodiment.
Figure 3:
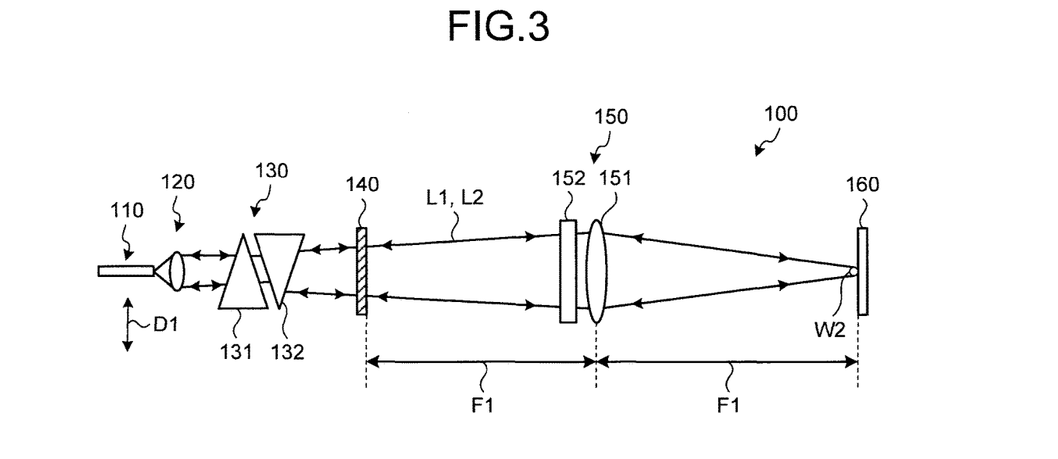
FIG. 3 is a schematic configuration diagram of the optical switching device according to the embodiment.
Figure 4:
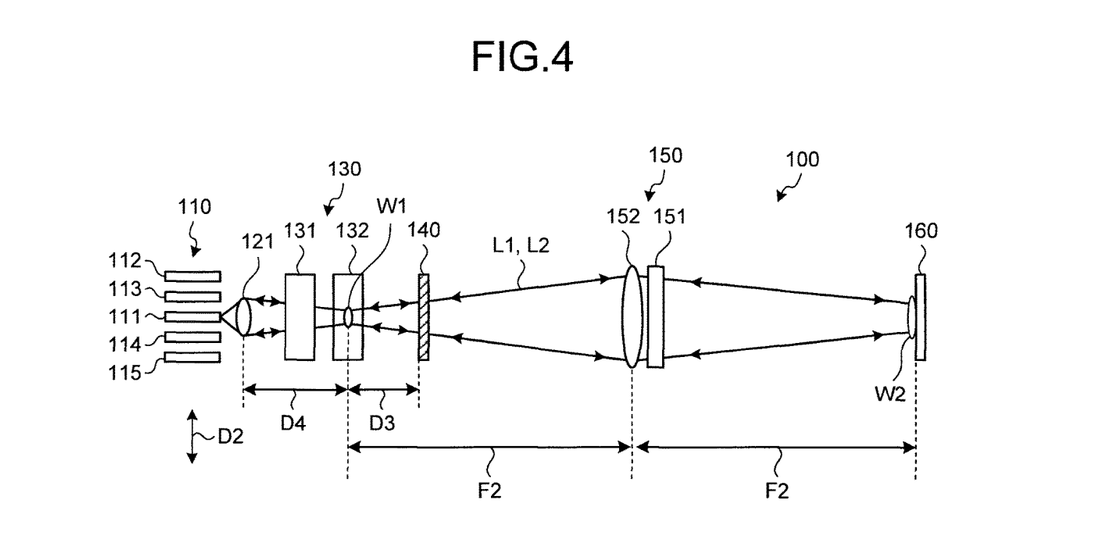
FIG. 4 is a schematic configuration diagram of the optical switching device according to the embodiment.

FIGS. 1 to 4 are schematic configuration diagrams of an optical switching device according to an embodiment. An optical switching device 100 is a light operation device which conducts a switching operation of an optical path. FIGS. 1 and 3 are drawings of the optical switching device 100 viewed in a direction perpendicular to an optical dispersion direction (a direction in which a beam diameter in the anamorphic prism pair increases indicated by a direction D1). FIGS. 2 and 4 are drawings of the optical switching device 100 viewed in a direction perpendicular to an optical-switching direction (indicated by a direction D2). FIGS. 1 and 2 are drawings showing input lights with rays, and FIGS. 3 and 4 are drawings showing the input lights with paths of spot sizes of Gaussian beams.

The optical switching device 100 is configured by arranging an light input and output port 110, a collimator lens array 120, an anamorphic prism pair 130 which is an anamorphic optical system, a diffraction grating 140 which is an optical dispersion element, a condensing lens system 150, and an optical switching element 160 in this order.

Since the optical path is bent at the diffraction grating 140 actually, each of the elements from the anamorphic prism pair 130 to the optical switching element 160 is disposed with an angle prior to, and subsequent to, the diffraction grating 1040. In addition, sometimes the optical path may be shifted to a direction, i.e., the direction D1 in the anamorphic prism pair 130. FIGS. 1 to 4 show each of the elements disposed in series to simplify explanation.

The light input and output port 110 is provided with optical fiber ports 111, 112, 113, 114, 115 configured with optical fibers. The optical fiber ports 111 to 115 are arranged with approximately equal intervals and in an array manner along a predetermined arrangement direction (i.e., in the direction D2 which is the optical-switching direction). A light from outside is input into one of the optical fiber ports 111 to 115, or one of the optical fiber ports 111 to 115 output a light to outside. The light input to, or output from, the optical switching device 100 not being limited specifically may be, for example, a signal light for use in optical communication of wavelengths from 1520 to 1620 nm.

The collimator lens array 120 includes a plurality of collimator lenses. Although, as the collimator lens array 120, FIGS. 2 and 4 show only the collimator lenses 121, 122 corresponding to the optical fiber ports 111 and 112 constituting the light input and output port 110, each collimator lens of the collimator lens array 120 is disposed corresponding to each of the optical fiber ports 111 to 115 constituting the light input and output port 110. The collimator lens array 120 has a function of collimating the light output from each of the optical fiber ports 111 to 115 or condensing the input collimated light on, and coupling the input collimated light with, each of the optical fiber ports 111 to 115.

The optical switching element 160 is configured so that the respective reflection elements 161, 162, 163 rotate by a predetermined angle around each of rotation axes that are parallel to the direction D1. The optical switching element 160 has functions of reflecting, and switching an optical path of, a light input from one of the optical fiber ports of the light input and output port 110, and outputting the reflected light toward another one of the optical fiber ports of the light input and output port 110. For the optical switching element 160, an element is available which uses, for example, a technology of Micro Electro Mechanical Systems (MEMS).

The condensing lens system 150 is disposed between the light input and output port 110 and the optical switching element 160. The condensing lens system 150 couples the light input and output port 110 with the optical switching element 160 optically.

The condensing lens system 150 is configured by a cylindrical lens 151 and a cylindrical lens 152. The cylindrical lens 151 has a first focal distance in the direction D1 which is the beam-diameter-expanding direction and does not have a focal point in the direction D2 which is the optical-switching direction. The cylindrical lens 152 has a second focal distance in the direction D2 and does not have a focal point in the direction D1. Herein the first focal distance and the second focal distance differ from each other.

The anamorphic prism pair 130 is configured by two prisms 131, 132 and is disposed between the light input and output port 110 and the condensing lens system 150. The anamorphic prism pair 130 has a function of expanding the beam shape of the light, input from a side of the light input and output port 110, in the direction D1 which is the beam-diameter-expanding direction. Since the anamorphic prism pair 130 has optical reciprocity, the anamorphic prism pair 130 also has a function of reducing the beam shape of the light input from a side of the optical switching element 160 in the direction D1. The anamorphic prism pair 130 may be replaced with another anamorphic optical system such as, for example, a cylindrical lens system. Although, as a method of expanding the beam diameter, the present embodiment is not limited to the anamorphic prism pair, the present embodiment may use an anamorphic prism.

In the optical switching device 100, the optical fiber port 111 disposed to coincide with the optical axis of the condensing lens system 150 is set to be a common optical fiber port (Com port) into which a light is input from outside, and the other four optical fiber ports 112, 113, 114, 115 are set as optical fiber ports from which a light is output to outside. That is, the optical switching device 100 functions as a 1×4-optical switch.

Hereafter, an operation of the optical switching device 100 will be explained by using FIGS. 1 and 2. At first, a signal light L1 is input to the optical fiber port 111 from outside. The signal light L1 is a WDM signal light and includes signal lights L1a, L1b, L1c having wavelengths that differ from each other.

The optical fiber port 111 outputs the input signal light L1 to the collimator lens 121. The collimator lens 121 makes the signal light L1 an approximately collimated light of which beam shape is an approximate circular shape. The anamorphic prism pair 130 expands the beam shape of the approximately collimated signal light L1 in the direction D1 to be an oval. The diffraction grating 140 diffracts the oval-shaped signal light L1 at a predetermined diffraction angle corresponding to the wavelengths of the signal light L1. As a result, the signal light L1 is separated to signal lights L1a, L1b, L1c.

The condensing lens system 150 makes the diffracted signal lights L1a, L1b, L1c condensed on the corresponding reflection elements 161, 162, 163 of the optical switching element 160. Rotation angles of the respective reflection elements 161, 162, 163 are adjusted independently, and thus, the optical switching element 160 makes each of the condensed signal lights L1b, L1a, L1c reflected at a predetermined reflection angle corresponding to the wavelength of each signal light.

Hereafter, among the reflected signal lights, a signal light L2 which is the reflected light of the signal light L1a will be explained as a representative of the reflected light. The condensing lens system 150 makes the reflected signal light L2 an approximately collimated light.

The anamorphic prism pair 130 reduces the beam shape of the signal light L2 with its optical reciprocity in the direction D1 back to an approximate circular shape. Subsequently, the signal light L2 is input to the collimator lens 122 corresponding to the optical fiber port 112. The collimator lens 122 condenses the signal light L2 and makes the signal light L2 be coupled with the optical fiber port 112. The optical fiber port 112 outputs the coupled light to outside. As explained above, the optical switching device 100 is capable of switching a path of the signal light input from the optical fiber port 111 as a Com port to the optical fiber port 112.

Regarding the signal lights L1b, L1c each having other wavelength, their paths are switched respectively to an optical fiber port other than the optical fiber port 112, for example, the optical fiber ports 113, 114 by adjusting the rotation angles of the reflection elements 161, 163. This allows a desirable switching of path to be achieved corresponding to a wavelength of a signal light.

Hereafter, the optical switching device 100 will be explained with reference to FIGS. 3 and 4 in comparison with FIGS. 8 and 9.

Similarly to the case of FIGS. 8 and 9, the optical switching device 100 is configured to dispose the anamorphic prism pair 130 between the collimator lens array 120 and the diffraction grating 140. Therefore, it is difficult to dispose the diffraction grating 140 at a position of the beam-waist W1 of the signal light L1 output from the collimator lens 121.

However, in the optical switching device 100, the condensing lens system 150 has the first focal distance in the direction D1 and the second focal distance, that differs from the first focal distance, in the direction D2. This results in allowing the beam-waist W2 of the signal light L1 having transmitted through the condensing lens system 150 to be at an appropriate position for the optical switching element 160 in both the direction D1 and the direction D2.

A specific example of arrangement of each element will be explained. As shown in FIG. 3, a design is preferable in which the diffraction grating 140 and the cylindrical lens 151 be disposed to be separated by a focal distance F1 (first focal distance) of the cylindrical lens 151. Hereby, as shown in FIG. 1, the signal lights L1a to L1c dispersed by the diffraction grating 140 are incident to the optical switching element 160 perpendicularly when viewed in the direction perpendicular to the optical dispersion direction (direction D2). Therefore, there is no need of rotating the optical switching element 160 around each rotation axis in parallel with the direction D2. A design is preferable in which the cylindrical lens 151 and the optical switching element 160 be disposed to be separated by a focal distance F1 (first focal distance) of the cylindrical lens 151. Hereby, the position of the beam-waist W2 of the signal light L1 having transmitted through the condensing lens system 150 coincides with the position of the optical switching element 160 in the direction D1, and the signal light L2 is condensed at an end face of each optical fiber port of the light input and output port 110 in the direction D1.

Simultaneously, a design is preferable in which the position of the optical switching element 160 and the position of the beam-waist W1 of the signal light L1 output from the collimator lens 121 be disposed at the position of the focal distance F2 (second focal distance) of the cylindrical lens 152. Hereby, the position of the beam-waist W2 of the signal light L1 having transmitted through the condensing lens system 150 coincides with the position of the optical switching element 160 also in the direction D2, and the signal light L2 is condensed at an end face of each optical fiber port of the light input and output port 110.

Both FIGS. 3 and 4 showing that the arrow lines, which indicate spot sizes of the signal light L1 and the signal light L2, coincide indicates that the paths of the spot sizes coincide approximately between the signal light L1 and the signal light L2.

Therefore, since efficiency for coupling the signal light L2 to the optical fiber port 111 is suppressed from being lowered in both the directions D1 and D2, Occurrence of optical loss is suppressed.

If f1, f2 indicate values for the first focal distance and the second focal distance of the condensing lens system 150, a combination thereof may be, for example, (f1, f2)=(80 mm, 100 mm), (100 mm, 120 mm), or (200 mm, 220 mm). As described above, it is preferable that the second focal distance be longer than the first focal distance, that is, f2>f1 is preferable.

If d3 indicates a value for a distance D3 between the diffraction grating 140 and the beam-waist W1 in this state, it is $2 \times (f2-f1) \approx d3 = 40$ mm. Since it is d3+d4=51 mm even if d4 indicating a value for a distance D4 between the collimator lens 121 and the beam-waist W1 is short, such as 11 mm, it is possible to obtain a distance for disposing an optical system such as an anamorphic prism pair or the like. In this case, although the beam-waist W1 is positioned at a side of the collimator lens 121 relative to the diffraction grating 140, occurrence of optical loss is suppressed.

Since, when the focal distance of the collimator lens 121 is, for example, 1.5 mm, a designed distance is approximately 22 mm for obtaining the farthest beam-waist of the Gaussian beam, the collimator lens 121 of which focal distance is short as equal to or shorter than 1.5 mm can be used. Other collimator lenses are similar to the collimator lens 121.

Even if, in the optical switching device 100, the length of the anamorphic prism pair 130 in a light-propagation direction is longer than the distance D4 between the collimator lens 121 and the beam-waist W1, the above-described occurrence of optical loss is suppressed. Therefore, a degree of freedom in design is high for the size of the anamorphic prism pair 130.

Since, in the optical switching device 100, the beam-waist W1 may be positioned to a side of the collimator lens 121 relative to the diffraction grating 140, a lens, of which focal distance is short, can be used for a collimator lens constituting the collimator lens array 120 including the collimator lens 121. Hereby the distance between the collimator lens array 120 and the light input and output port 110, and intervals among the optical fiber ports 111, 112, 113, 114, 115 can be reduced. As a result, since an angle at which a path of a signal light is switched can be reduced in the optical switching device 100, a load accompanying the switching of the path (for example, electric power to be applied for rotating the optical switching element 160) can be alleviated.

Although it is preferable that the optical switching element 160 be at positions of the respective focal distances F1 and F2 of the condensing lens system 150 in the directions D1 and D2, the optical switching element 160 may be at a position shifted from the focal distances F1 and F2 within an acceptable range as long as the position allows a light (for example, signal light L1) to form an image by the condensing lens system 150. Similarly, although it is preferable that the beam-waist (for example, beam-waist W1) by each collimator lens of the collimator lens array 120 be at a position of a focal distance F2, the beam-waist may be at a position shifted from the focal distance F2 within a tolerable range as long as the position allows a light (for example, signal light L2) to form an image by the condensing lens system 150. The acceptable range herein is a value set corresponding to a tolerance to form an image depending on, for example, a diameter of beam-waist.

Although, in the above-described embodiment, the condensing lens system 150 is constituted by the two cylindrical lenses 151, 152, a configuration for a condensing lens system for use is not limited specifically as long as the condensing lens system includes a first focal distance and a second focal distance that differ from each other in the beam-diameter-expanding direction and the optical-switching direction.

Figure 5:
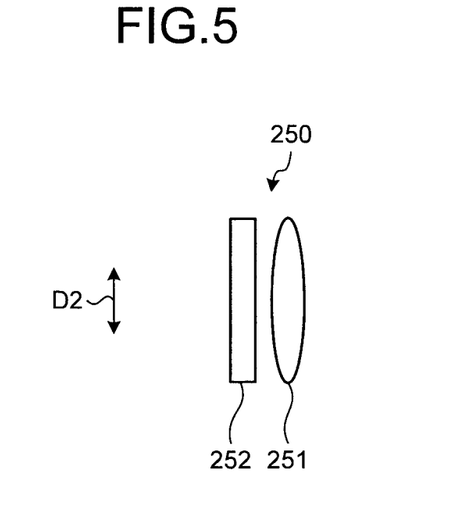
FIG. 5 is a view showing another aspect of the configuration of a condensing lens system.
Figure 6:
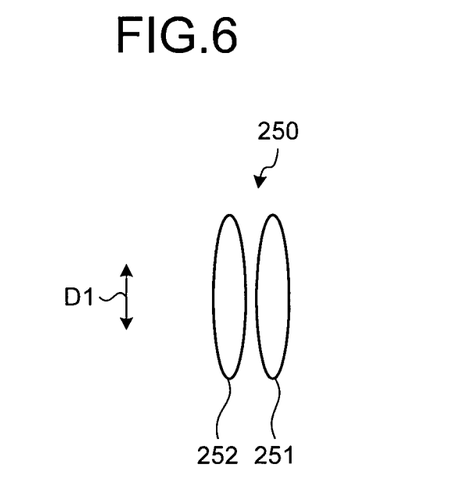
FIG. 6 is a view showing another aspect of the configuration of the condensing lens system.

FIG. 5 and FIG. 6 are drawings showing another aspect of the configuration of the condensing lens system. FIG. 5 is a drawing of the condensing lens system 250 viewed from a direction perpendicular to the direction D2 that is an optical-switching direction, and FIG. 6 is a drawing of the condensing lens system 250 viewed from a direction perpendicular to the direction D1 that is the beam-diameter-expanding direction.

The condensing lens system 250 has a point-symmetric lens 251 and a cylindrical lens 252. The point-symmetric lens 251 has the second focal distance. On the other hand, the cylindrical lens 252 has a focal distance such that a synthetic focal distance with the point-symmetric lens 251 is the first focal distance in the direction D1. Hereby the condensing lens system 250 has the first focal distance in the direction D1 and the second focal distance in the direction D2.

As the condensing lens system may be configured to have a point-symmetric lens having the first focal distance and a cylindrical lens having a focal distance such that a synthetic focal distance with the point-symmetric lens is the second focal distance. The condensing lens system also may be configured by a single lens.

The present invention is not limited to the diffraction grating of a transmission-type in the above-described embodiment, and a reflection type diffraction grating may be used. In place of the diffraction grating, other optical dispersion elements such as a dispersion prism or the like may be used. The optical switching device according to the present invention may be configured as a non-wavelength-selective optical switching device not using an optical dispersion element. As an optical switching element, other optical switching element may be used such as spatial light modulator (SLM) or the like. An SLM is a device operating a light by controlling a phase of each one of numerous pixels aligned in a manner of one-dimension or two-dimension. A liquid crystal on silicon (LCOS) may be typical.

In general, an LCOS has polarization dependency. Therefore, in a case of using an LCOS as an optical switching element, polarizations must be matched in a polarization direction in which a phase variation of the LCOS is received. For example, two separated orthogonal polarizations are provided by a Wollaston prism, a Savart plate, a polarization beam splitter (PBS) or the like. Rotating one of the two orthogonal polarizations by 90 degrees with, for example, a $\lambda/2$ wavelength plate allows the two polarizations to be matched to receive the phase variation of the LCOS. Herein an element for separating the polarizations and the $\lambda/2$ wavelength plate may be disposed between the collimator lens array 120 and the diffraction grating 140, or just prior to the optical switching element 160.

Although, the optical switching device 100 is a 1×4-optical switch in the above-described embodiment, the number of ports to which a light is input or from which a light is output is not limited specifically in the present invention, and the optical switching device 100 may be an N×M-optical switch (N and M are arbitrary integers). In the configuration of the optical switching device 100, the optical switching device 100 may be operated by inputting a signal light into any one of the optical fiber ports 112, 113, 114, 115 and outputting the signal light from the optical fiber port 111 which is a Com port. Hereby the optical switching device 100 can be used as a 4×1-optical switch.

Although the optical switching device has been explained in the above-described embodiment, an light-operating element having other optical operation function replacing the optical switching element as an light-operating element can be used as a light operation device, for example, a wavelength blocker, a waveform-shaper or the like.

Figure 7:
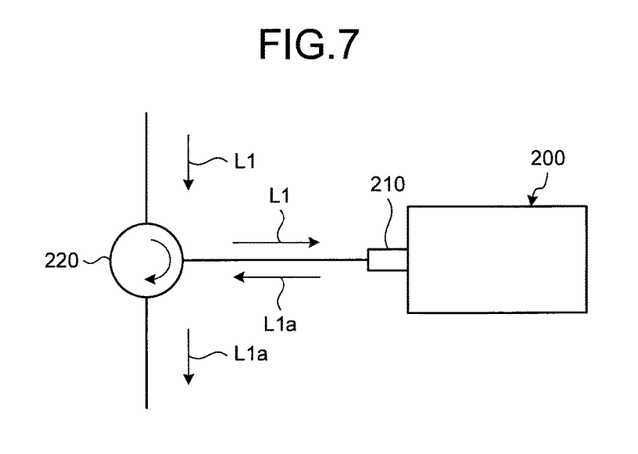
FIG. 7 is a view showing a configuration combining a wavelength blocker with an optical circulator.

The wavelength blocker is a light operation device having functions of outputting only a signal light having a specific wavelength component among WDM signal lights input thereto, and blocking the signal light having the other wavelength component. The wavelength blocker can be obtained by replacing the optical switching element 160 of the optical switching device 100 with the wavelength blocking unit having the light-operating element. The wavelength blocking unit can be configured by, for example, an SLM. Therefore, the wavelength blocker can be configured by arranging an optical input port and an optical output port, a collimator lens array, an anamorphic prism pair as an anamorphic optical system, a diffraction grating as an optical dispersion element, a condensing lens system, and a wavelength blocking unit in this order. The functions of the wavelength blocker can be achieved by controlling diffracting a WDM signal light, input from the optical input port by the diffraction grating, switching, among signal lights condensed on the wavelength blocking unit, only a signal light having a wavelength component, which is desired to be output, to be coupled to an optical output port so that signal lights having other wavelength component are not coupled to the output port. The above-described optical input port and the optical output port do not have to be separate ports, and one light input and output port may function as an optical input port and an optical output port. In this case, as shown in FIG. 7, a configuration is preferable in which an optical circulator 220 be disposed prior to an light input and output port 210 of the wavelength blocker 200. This configuration is capable of extracting the signal light L1a, which is desired to be output therefrom, by inputting the WDM signal light L1 into the light input and output port 210 of the wavelength blocker 200 via the optical circulator 220.

The waveform-shaper is a light operation device having a function of controlling a shape of spectrum and a time waveform of an optical pulse by controlling an intensity and a phase of each wavelength component of input light. The waveform-shaper is achieved by replacing the optical switching element 160 of the optical switching device 100 with a waveform-shaping section having the light-operating element. The waveform-shaping section can be configured by an SLM as, for example, an light-operating element. Therefore, the waveform-shaper can be configured by arranging an optical input port and an optical output port, a collimator lens array, an anamorphic prism pair as an anamorphic optical system, a diffraction grating as an optical dispersion element, a condensing lens system, and a waveform-shaping section in this order. The functions of the waveform-shaper can be achieved by controlling diffracting a light, input from the optical input port by the diffraction grating, switching, among lights of respective wavelength components condensed at the waveform-shaping section, only a light having a wavelength component, which is desired to be output to be coupled to the optical output port, so that lights having other wavelength component are not coupled to the output port. Hereby, for example, a shape of a spectrum can be controlled. Moreover, in the waveform-shaper, a phase of each wavelength component can be controlled by controlling an offset amount of phase in a pixel of an SLM coinciding with each wavelength. In a case of the waveform-shaper similarly to the wavelength blocker, the above-described optical input port and the optical output port do not have to be separate ports, and one light input and output port may function as an optical input port and an optical output port. In this case, similarly to FIG. 7, the output light can be extracted by disposing an optical circulator prior to the light input and output port.

As described above, the light operation device according to the present invention is useful as an optical switching device for use in optical communication.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light operation device, comprising:
   a light input and output port having ports into which a light is input from outside, or from which a light is output to outside;
   a light-operating element reflecting the light input from any one of the ports of the light input and output port and outputting the reflected light to any one of the ports of the light input and output port;
   a condensing lens system being disposed between the light input and output port and the light-operating element and coupling the light input and output port with the light-operating element optically;
   an anamorphic optical system being disposed between the light input and output port and the condensing lens system and expanding a beam diameter of the light input from a side of the light input and output port in a beam-diameter-expanding direction, wherein
   in the condensing lens system, a first focal distance in the beam-diameter-expanding direction and a second focal distance in a direction perpendicular to the beam-diameter-expanding direction differ from each other, and
   a beam waist of the light in the direction perpendicular to the beam-diameter-expanding direction from any one of the ports of the light input and output port, the light being condensed with the condensing lens system in the direction perpendicular to the beam-diameter-expanding direction, is disposed at a position away from the condensing lens system by the second focal distance between the light input and output port and the condensing lens system.

2. The light operation device according to claim 1, wherein the second focal distance is longer than the first focal distance.

3. The light operation device according to claim 1, wherein the light-operating element is disposed at the second focal distance of the condensing lens system in the beam-diameter-expanding direction.

4. The light operation device according to claim 1, wherein the light-operating element is disposed at the second focal distance of the condensing lens system in a direction perpendicular to the beam-diameter-expanding direction.

5. The light operation device according to claim 1, further comprising an optical dispersion element disposed between the anamorphic optical system and the condensing lens system, wherein the light operation device functions as a wavelength-selective optical-switch.

6. The light operation device according to claim 5, wherein
   the beam waist of the light in the direction perpendicular to the beam-diameter-expanding direction from any one of the ports of the light input and output port is positioned at an opposite side of the light input and output port relative to the optical dispersion element.

7. The light operation device according to claim 5, wherein the optical dispersion element is disposed at the second focal distance of the condensing lens system in the beam-diameter-expanding direction.

8. The light operation device according to claim 1, further comprising a collimator lens provided corresponding to one of the ports of the light input and output port.

9. The light operation device according to claim 1, wherein the condensing lens system has a first cylindrical lens having the first focal distance and a second cylindrical lens having the second focal distance.

10. The light operation device according to claim 1, wherein the condensing lens system has a point-symmetric lens having the second focal distance and a cylindrical lens having a focal distance of which synthetic focal distance with the point-symmetric lens is the first focal distance, or the condensing lens system has a point-symmetric lens having the first focal distance and a cylindrical lens having a focal distance of which synthetic focal distance with the point-symmetric lens is the second focal distance.

11. A light operation device, comprising:
    a light input and output port having at least one port into which a light is input from outside, or from which a light is output to outside;
    a collimator lens provided corresponding to the at least one port of the light input and output port;
    a light-operating element reflecting the light input from any one of the ports of the light input and output port and outputting the reflected light to any one of the ports of the light input and output port;
    a condensing lens system being disposed between the light input and output port and the light-operating element and coupling the light input and output port with the light-operating element optically;
    an anamorphic optical system being disposed between the light input and output port and the condensing lens system and expanding a beam diameter of the light input from a side of the light input and output port in a beam-diameter-expanding direction, wherein
    in the condensing lens system, a first focal distance in the beam-diameter-expanding direction and a second focal distance in a direction perpendicular to the beam-diameter-expanding direction differ from each other, and
    a beam waist formed by the collimator lens in the direction perpendicular to the beam-diameter-expanding direction is disposed at a position away from the condensing lens system by the second focal distance.

* * * * *